US010909583B2

(12) United States Patent
Fletcher

(10) Patent No.: US 10,909,583 B2
(45) Date of Patent: *Feb. 2, 2021

(54) MOBILE DEVICE STREAMING MEDIA APPLICATION

(71) Applicant: Mary Anne Fletcher, Jackson, GA (US)

(72) Inventor: Mary Anne Fletcher, Jackson, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/790,953

(22) Filed: Feb. 14, 2020

(65) Prior Publication Data

US 2020/0184520 A1 Jun. 11, 2020

Related U.S. Application Data

(63) Continuation of application No. 16/157,269, filed on Oct. 11, 2018, now Pat. No. 10,565,628, which is a
(Continued)

(51) Int. Cl.
*G06Q 30/02* (2012.01)
*H04L 12/58* (2006.01)
(Continued)

(52) U.S. Cl.
CPC ......... *G06Q 30/0279* (2013.01); *G06Q 30/02* (2013.01); *G06Q 30/0267* (2013.01);
(Continued)

(58) Field of Classification Search
CPC .......... G06Q 30/0279; G06Q 30/0269; G06Q 30/0267; G06Q 30/0273; G06Q 30/0641; H04L 51/04; H04L 65/4076; H04L 65/04
(Continued)

(56) References Cited

U.S. PATENT DOCUMENTS 6,757,273 B1 6/2004 Hsu
7,064,760 B2 6/2006 Capin
(Continued)

FOREIGN PATENT DOCUMENTS

WO 2005009019 A2 1/2005
WO 2008/072093 A2 6/2008
WO 2010108053 A1 9/2010

OTHER PUBLICATIONS https://techcrunch.com/2009/03/05/ustream-launches-mobile-video-broadcasting-apps/ Ustream Launches Mobile Video Broadcasting Apps. Erick Schonfeld, Mar. 5, 2009.
(Continued)

*Primary Examiner* — Tauqir Hussain
(74) *Attorney, Agent, or Firm* — Vance Intellectual Property, PC

(57) ABSTRACT

A system and process for coordinating streaming content or messages is provided. A network-connected server maintains a database containing media content-related data, such as the text of a message, accompanying media, time of airing, payment and related comments. A user can view these feeds or streams of these consciousness messages by downloading a mobile application or browsing to a website. The application can also be used to create, schedule and pay for a media content message.

28 Claims, 14 Drawing Sheets

Related U.S. Application Data continuation of application No. 15/273,335, filed on Sep. 22, 2016, now Pat. No. 10,102,553, which is a continuation of application No. 15/041,422, filed on Feb. 11, 2016, now Pat. No. 9,456,013, which is a continuation of application No. 14/512,353, filed on Oct. 10, 2014, now Pat. No. 9,294,527, which is a continuation of application No. 13/967,414, filed on Aug. 15, 2013, now Pat. No. 8,862,678, which is a continuation of application No. 13/027,191, filed on Feb. 14, 2011, now Pat. No. 8,516,063.

(60) Provisional application No. 61/304,331, filed on Feb. 12, 2010.

(51) Int. Cl.
*H04L 29/06* (2006.01)
*G06Q 30/06* (2012.01)

(52) U.S. Cl.
CPC ..... *G06Q 30/0269* (2013.01); *G06Q 30/0273* (2013.01); *G06Q 30/0641* (2013.01); *H04L 51/04* (2013.01); *H04L 51/32* (2013.01); *H04L 65/403* (2013.01); *H04L 65/4076* (2013.01); *H04L 65/4092* (2013.01); *H04L 65/60* (2013.01); *G06Q 30/0277* (2013.01)

(58) Field of Classification Search
USPC .......................................................... 709/227
See application file for complete search history.

(56) References Cited

U.S. PATENT DOCUMENTS

| | | | |
|---|---|---|---|
| 7,107,010 B2 | 9/2006 | Heinonen | |
| 7,558,869 B2 | 7/2009 | Leon | |
| 7,593,740 B2 | 9/2009 | Crowley | |
| 7,877,461 B1 | 1/2011 | Rimmer | |
| 7,945,546 B2 | 5/2011 | Bliss | |
| 7,960,945 B1 | 6/2011 | Onorato | |
| 7,996,775 B2 | 8/2011 | Cole | |
| 8,086,253 B1 | 12/2011 | Kalamkar | |
| 8,108,781 B2 | 1/2012 | Laansoo | |
| 8,128,503 B1 | 3/2012 | Haot | |
| 8,219,028 B1 | 7/2012 | Flamholz | |
| 8,219,134 B2 | 7/2012 | Maharajh et al. | |
| 8,266,550 B1 | 9/2012 | Cleron | |
| 8,291,341 B2 | 10/2012 | Tseng | |
| 8,325,213 B2 | 12/2012 | Lamb | |
| 8,385,950 B1 | 2/2013 | Wagner | |
| 8,433,611 B2 | 4/2013 | Lax | |
| 8,493,931 B1 | 7/2013 | Nix | |
| 8,620,878 B2 | 12/2013 | Feher | |
| 8,862,762 B1 | 10/2014 | Motrenko et al. | |
| 2004/0071088 A1 | 4/2004 | Curcio | |
| 2004/0186877 A1 | 9/2004 | Wang | |
| 2005/0254526 A1 | 11/2005 | Wang | |
| 2005/0265555 A1 | 12/2005 | Pippuri | |
| 2005/0283444 A1 | 12/2005 | Ekberg | |
| 2006/0031548 A1 | 2/2006 | Funchess | |
| 2007/0294177 A1* | 12/2007 | Volk | G06Q 30/06 705/52 |
| 2008/0040498 A1 | 2/2008 | Setlur | |
| 2008/0076409 A1 | 3/2008 | Hinrikus | |
| 2008/0085682 A1* | 4/2008 | Rao | H04M 1/7253 455/74 |
| 2008/0126415 A1 | 5/2008 | Chaudhury | |
| 2008/0195664 A1 | 8/2008 | Maharajh et al. | |
| 2008/0235123 A1* | 9/2008 | Olliphant | G06Q 20/12 705/35 |
| 2008/0276266 A1 | 11/2008 | Huchital | |
| 2009/0006191 A1 | 1/2009 | Arankalle | |
| 2009/0144772 A1 | 6/2009 | Fink | |
| 2009/0171780 A1 | 7/2009 | Aldrey et al. | |
| 2009/0198538 A1 | 8/2009 | Gupta et al. | |
| 2009/0204479 A1 | 8/2009 | Wolinsky et al. | |
| 2009/0248665 A1 | 10/2009 | Garg | |
| 2010/0037204 A1 | 2/2010 | Lin | |
| 2010/0045666 A1 | 2/2010 | Kommann | |
| 2010/0060477 A1 | 3/2010 | Laasik | |
| 2010/0060715 A1 | 3/2010 | Laasik | |
| 2010/0064334 A1 | 3/2010 | Blackburn | |
| 2010/0153578 A1 | 6/2010 | Van Gassel | |
| 2010/0174547 A1 | 7/2010 | Bernard | |
| 2010/0198946 A1* | 8/2010 | Dowlatkhah | H04L 65/80 709/220 |
| 2010/0215167 A1 | 8/2010 | Burneo | |
| 2010/0262711 A1 | 10/2010 | Bouazizi | |
| 2011/0016182 A1* | 1/2011 | Harris | G06Q 30/02 709/206 |
| 2011/0191432 A1 | 8/2011 | Layson, Jr. | |
| 2011/0213657 A1 | 9/2011 | O'Malley | |
| 2011/0246659 A1 | 10/2011 | Bouazizi | |
| 2011/0289433 A1 | 11/2011 | Whalin et al. | |
| 2011/0307545 A1 | 12/2011 | Bouazizi | |
| 2012/0005287 A1 | 1/2012 | Gadel et al. | |
| 2012/0011267 A1 | 1/2012 | Ma et al. | |
| 2014/0051402 A1 | 2/2014 | Qureshi | |
| 2016/0309236 A1 | 10/2016 | Haot | |

OTHER PUBLICATIONS http://thenextweb.com/2009/06/10/nokia-bundle-qik-smartphone-live-streaming/#gref Qik to be bundled with every Nokia smartphone-is live streaming about to take off? Martin Bryant, Jun. 10, 2009.

https://gigaom.com/2009/03/11/qik-pairs-with-nokias-ovi-for-live-streaming/ Qik Pairs with Nokia's Ovi for Live Streaming, Cross-Posting. Kevin C Tofel, Mar. 11, 2009.

http://www.iphonehacks.com/2009/03/skype-for-iphone-available-on-app-store-in-japan.html Skype for iPhone Available on App Store. iPhonehacks, Mar. 30, 2009.

http://phys.org/news/2009-04-skype-iphone-worth-download.html Skype on the iPhone: Worth the download Scott Kleinberg, Apr. 8, 2009.

http://mashable.com/2009/11/25/ustream-viewer-android/#JT35VeW9BGqu Ustream Launches Viewer for Android Devices Stan Schroeder, Nov. 25, 2009.

http://www.ustream.tv/blog/2009/11/25/ustream-viewer-beta-for-android-in-the-marketplace/ Ustream Viewer beta for Andriod in the Marketplace Gyula Feher, Nov. 25, 2009.

https://techcrunch.com/2010/01/28/ustream-producer-desktop/ Ustream Helps Give Your Live Broadcast a Professional Feel With New Desktop Client Jason Kincaid, Jan. 28, 2010.

http://www.iphonejd.com/iphone_jd/2009/12/review-knocking-live-video-sharing.html Review: Knockling Live—stream live video from your iPhone Jeff Richardson, Dec. 3, 2009.

http://latimesblogs.latimes.com/technology/2009/12/ustream-video-iphone-app.html Ustream lets iPhones broadcast live and unlocks video recording for older models Mark Milian, Dec. 9, 2009.

https://techcrunch.com/2009/08/05/ustream-finally-launches-a-recording-iphone-app-no-live-video-but-a-lot-of-options/ Ustream Finally Launches a Recording iPhone App. No Live Video, But a Lot of Options MG Siegler, Aug. 5, 2009.

https://techcrunch.com/2009/10/15/apple-announces-in-app-purchases-for-free-iphone-applications/ Apple Announces In-App Purchases for Free iPhone Applications Jason Kincaid, Oct. 15, 2009.

\* cited by examiner

MOBILE DEVICE STREAMING MEDIA APPLICATION

RELATED APPLICATIONS

This application claims priority to U.S. Provisional Application Ser. No. 61/304,331 filed Feb. 12, 2010 entitled Mobile Device Prayer Application, the contents of which are incorporated in their entirety herein.

BACKGROUND OF THE INVENTION

Streaming media is multimedia that is constantly received by and presented to an end-user while being delivered by a streaming provider. The name refers to the delivery method of the medium rather than to the medium itself. The distinction is usually applied to media that are distributed over telecommunications networks, as most other delivery systems are either inherently streaming (e.g., radio, television) or inherently non-streaming (e.g., books, video cassettes, audio CDs). The verb 'to stream' is also derived from this term, meaning to deliver media in this manner. Internet television is a commonly streamed medium.

Live streaming, more specifically, means taking the media and broadcasting it live over the Internet. The process involves a camera for the media, an encoder to digitize the content, a media publisher where the streams are made available to potential end-users and a content delivery network to distribute and deliver the content. The media can then be viewed by end-users live.

Consciousness is variously defined as subjective experience, awareness, the ability to experience "feeling," wakefulness, the understanding of the concept "self," or the executive control system of the mind. It is an umbrella term that may refer to a variety of mental phenomena. Although humans realize what everyday experiences are, consciousness itself resists being defined, philosophers note.

Consciousness is the subject of much research in philosophy of mind, psychology, neuroscience, cognitive science and artificial intelligence. Issues of practical concern include how the presence of consciousness can be assessed in severely ill or comatose people; whether non-human consciousness exists and if so how it can be measured; at what point in fetal development consciousness begins; and whether computers can achieve a conscious state.

Prayer is a form of religious practice that seeks to activate a volitional rapport to a god or spirit through deliberate practice. Prayer may be either individual or communal and take place in public or in private.

It may involve the use of words or song. When language is used, prayer may take the form of a hymn, incantation, formal creedal statement, or a spontaneous utterance in the praying person. There are different forms of prayer such as petitionary prayers, prayers of supplication, thanksgiving, and worship/praise.

Prayer may be directed towards a deity, spirit, deceased person, or lofty idea, for the purpose of worshipping, requesting guidance, requesting assistance, confessing sins or to express one's thoughts and emotions. Thus, people pray for many reasons such as personal benefit or for the sake of others.

Most major religions involve prayer in one way or another. Some ritualize the act of prayer, requiring a strict sequence of actions or placing a restriction on who is permitted to pray, while others teach that prayer may be practiced spontaneously by anyone at any time.

SUMMARY OF THE INVENTION

In one embodiment according to the present invention, a system and process for coordinating a programmed media stream is provided. Preferably, this content relates to consciousness messages such as prayers, requests for charity, thoughts or similar messages. However, this content can also relate to breaking news, music videos, comedy or similar content. A network-connected server maintains a database containing media content-related data, such as the text of a message, accompanying media, time of airing, payment and related comments. A user can view these feeds or streams of these streams by downloading a mobile application or browsing to a website. The application or website can also be used to create, schedule and pay for media content airtime for a message or program.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
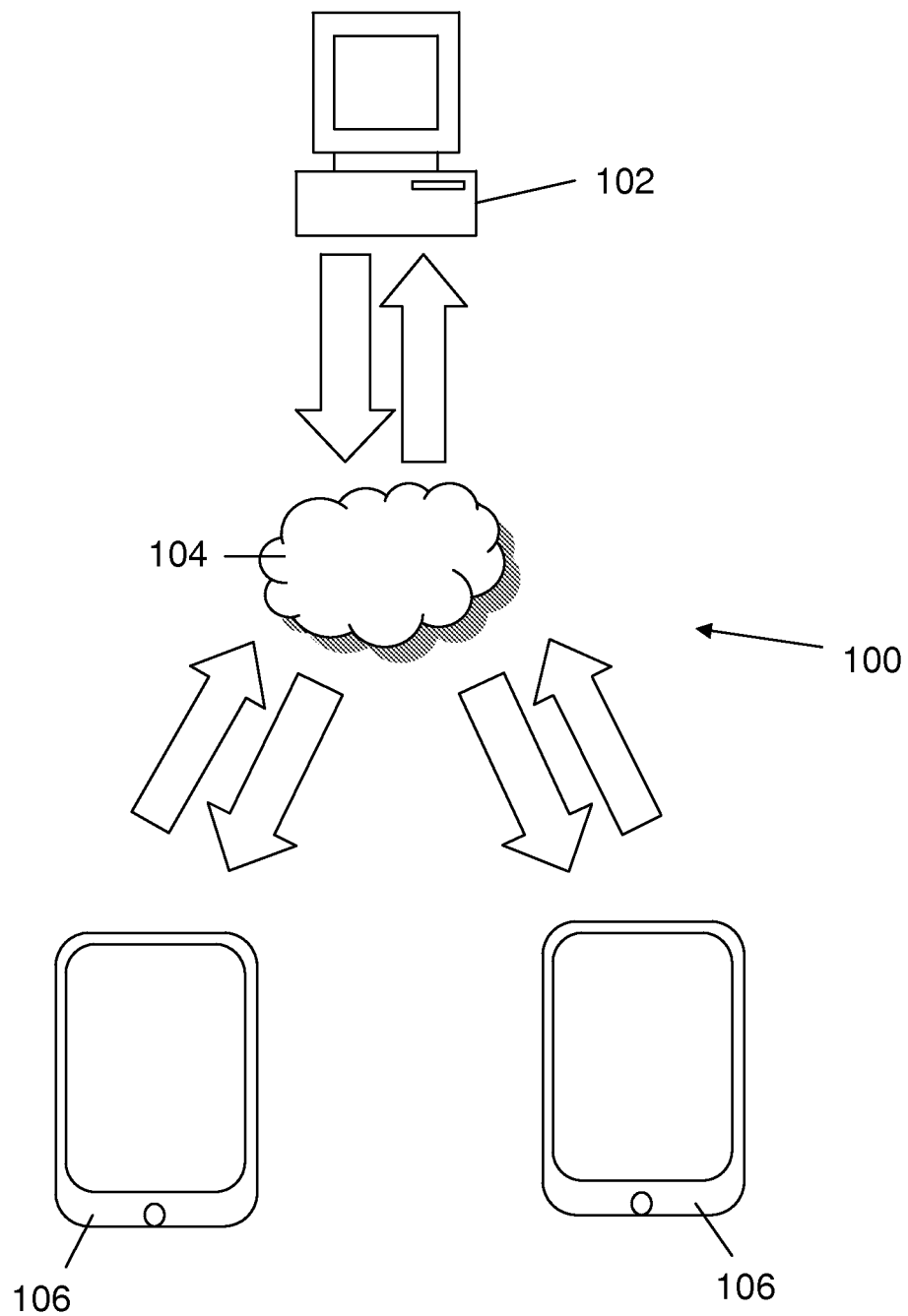
FIG. 1 illustrates a media content coordination system according to an embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms message, media message or program are used interchangeably in this specification and generally refer to text, audio, video or still images sent across the internet. In one aspect of the present invention, the system can be used for any media content type, such as news, comedy, drama, environmental messages, offers to purchase related items, and similar messages. In another aspect of the present invention, the system is used for consciousness messages, such as prayers, collective thoughts, appeals to charity and inspirational messages.

FIG. 1 illustrates an example media coordination system 100 according to the present invention which allows network connected devices, such as mobile devices 106 (cell phones, portable music players, tables, laptops, etc.), to coordinate times for specific media messages/programs to be streamed to other application users (e.g., a feed of message posts or a stream of real-time media data). Generally, a computer server 102 (e.g., a processor, RAM, a hard drive, an operating system, web serving software and database software) is connected to a wide area network 104 such as the internet or wireless cell phone data network. Mobile devices 106 are also connected to the network 104, allowing for communication to and from the server 102.

Figure 13:
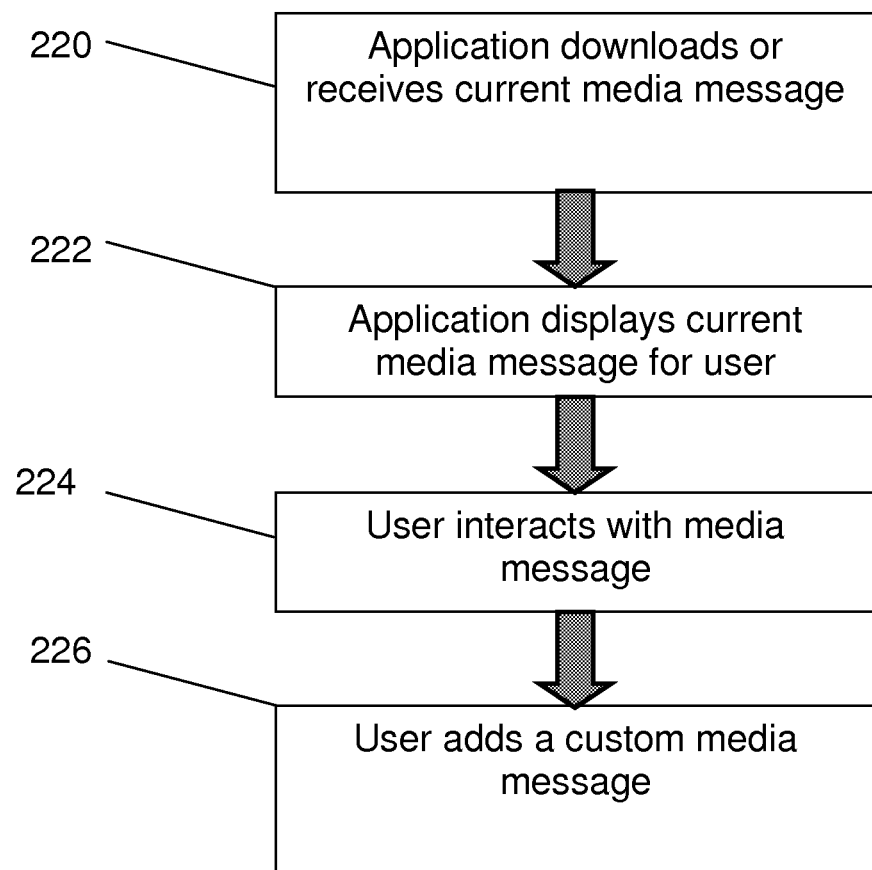
FIG. 13 illustrates a process of viewing and interacting with a current message according to an embodiment of the present invention; and, FIG. 14 illustrates an interface for in app purchases of items according to an embodiment of the present invention.
Figure 14:
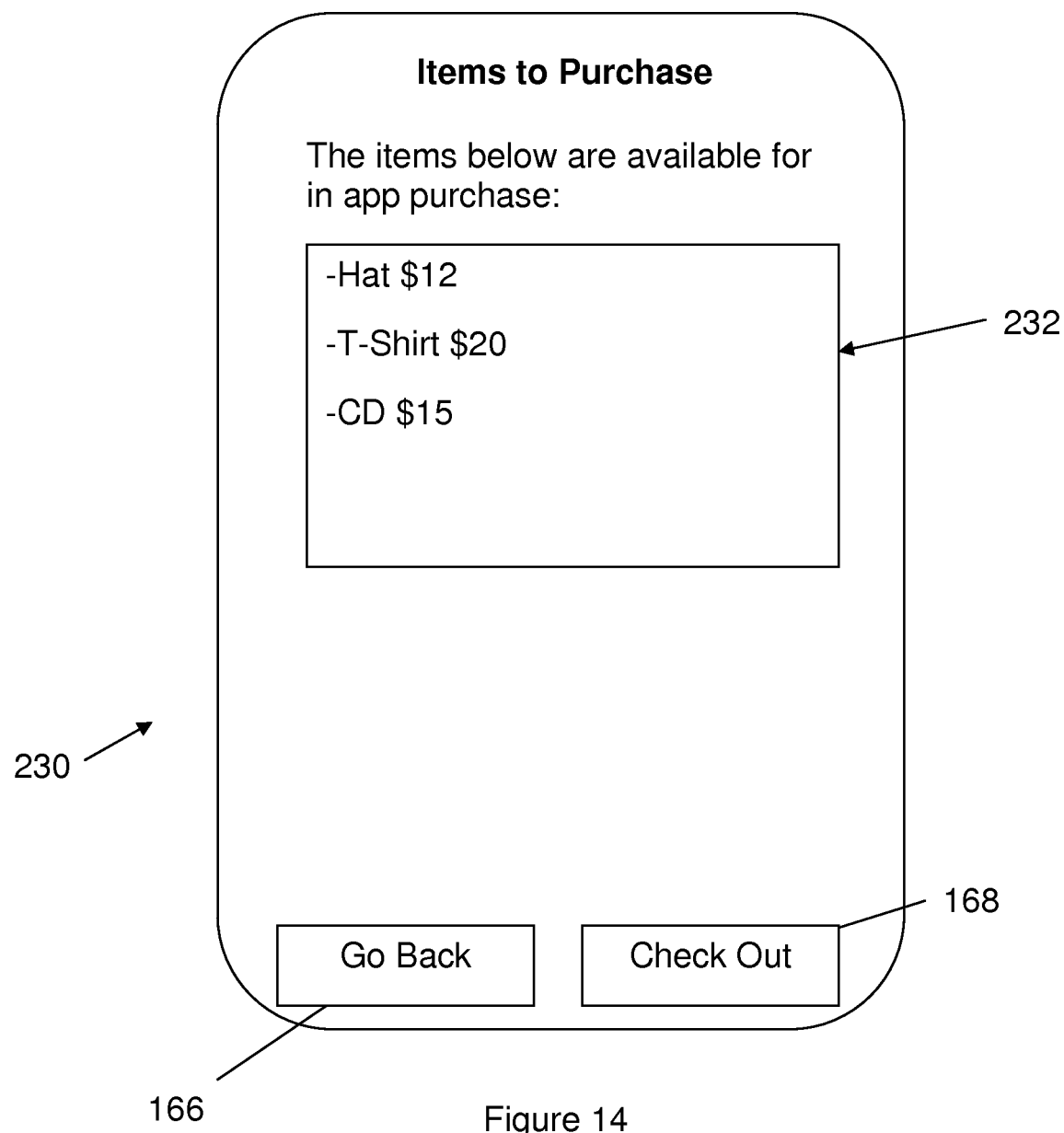

As seen in item 220 of the flow chart of FIG. 13, a user either executes the mobile media application on their mobile device or uses a browser to browse to an internet page supplied by the server 102. The application downloads the current media message/program (i.e., a thought or prayer video scheduled for airing at that time) from the server. Alternately, the server 102 may automatically push the current media message or link to the current media message via phone notifications, email or text messages.

In one example, delivery of the current media message to the mobile device 106 is performed as a feed that is downloaded as requested by the user. In another example, delivery of the current media message is achieved with a live streaming media file (e.g., streaming audio/video) that provides images, text and/or audio to the user's mobile device. In this respect, the media message stream is similar to a live television station having scheduled media messages as its programming.

In item 222, the mobile application displays the media message data supplied by the server 102. This data may include the text of a media message, an attached or linked-to media file, donation information and media message expiration information (i.e., when the current media message expires causing the mobile application to download a new current media message). Alternately, the media message data may be a live media stream, previously rendered by the server 102, which displays the images, text, audio, video or other items in a common media format (e.g., h.264 mp4 video format). In one preferred embodiment, the media message is a prayer, collective consciousness message, request for charity, environmental or similar message.

In item 224, the user views the media message data in an interface of the mobile application and interacts with the interface. For example, the user may add a comment about the media message, a donation, a greeting card or share a link to the media message via a social network, email, text message or similar communication. The user may also make purchases within the application (e.g., in app purchases, credit cards, Pay Pal, etc.) to buy gift certificates for message air time, greeting cards, or similar in application items.

In item 226, the user can design, upload and pay for a custom media message that is stored and aired from the server 102. The server will similarly air the custom media message at the specified time as the current media message, thereby distributing that media message out to other users of the mobile application and website.

Figure 10:
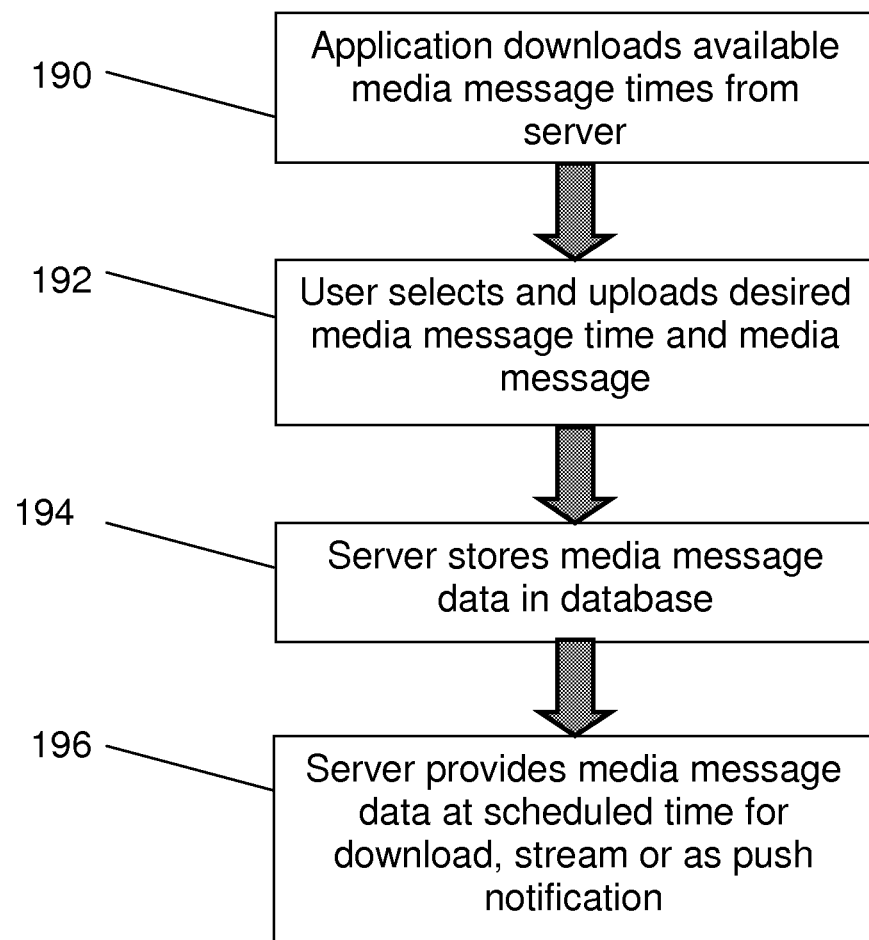
FIG. 10 illustrates a process of coordinating media content times according to an embodiment of the present invention.

FIG. 10 illustrates a flow chart of an example process for coordinating media messages. As seen in item 190, the mobile application is executed on the mobile device 106 that can download available times that a media message can be scheduled. A user can request availability of a specific time or the mobile application can download a variety of free times.

In item 192, the user selects a time that they would like to have their media message available, the text of their media message, any images or videos that they would like to accompany the media message, and payment information. This data is uploaded to server 102 and stored in a database in item 194.

As seen in item 196, the sever 102 provides media message data according to the scheduled time. This data can be rendered and streamed as a live streaming format, made available for download to each mobile device 106 running the application or can be sent out via a push notification, email or text message. Optionally, the push notification, email or text message can include a link that opens the mobile media message application to that specific media message or to a webpage displaying that media message.

The current media message can also be displayed on any participating websites. For example, an otherwise nonaffiliated website could include code that displays the current media message. In another example, the media message can be posted to a social media site, such as Facebook or Twitter, which allows users to subscribe. In this respect, people visiting websites otherwise unrelated to the server 102 can also view the current media message.

Figure 2:
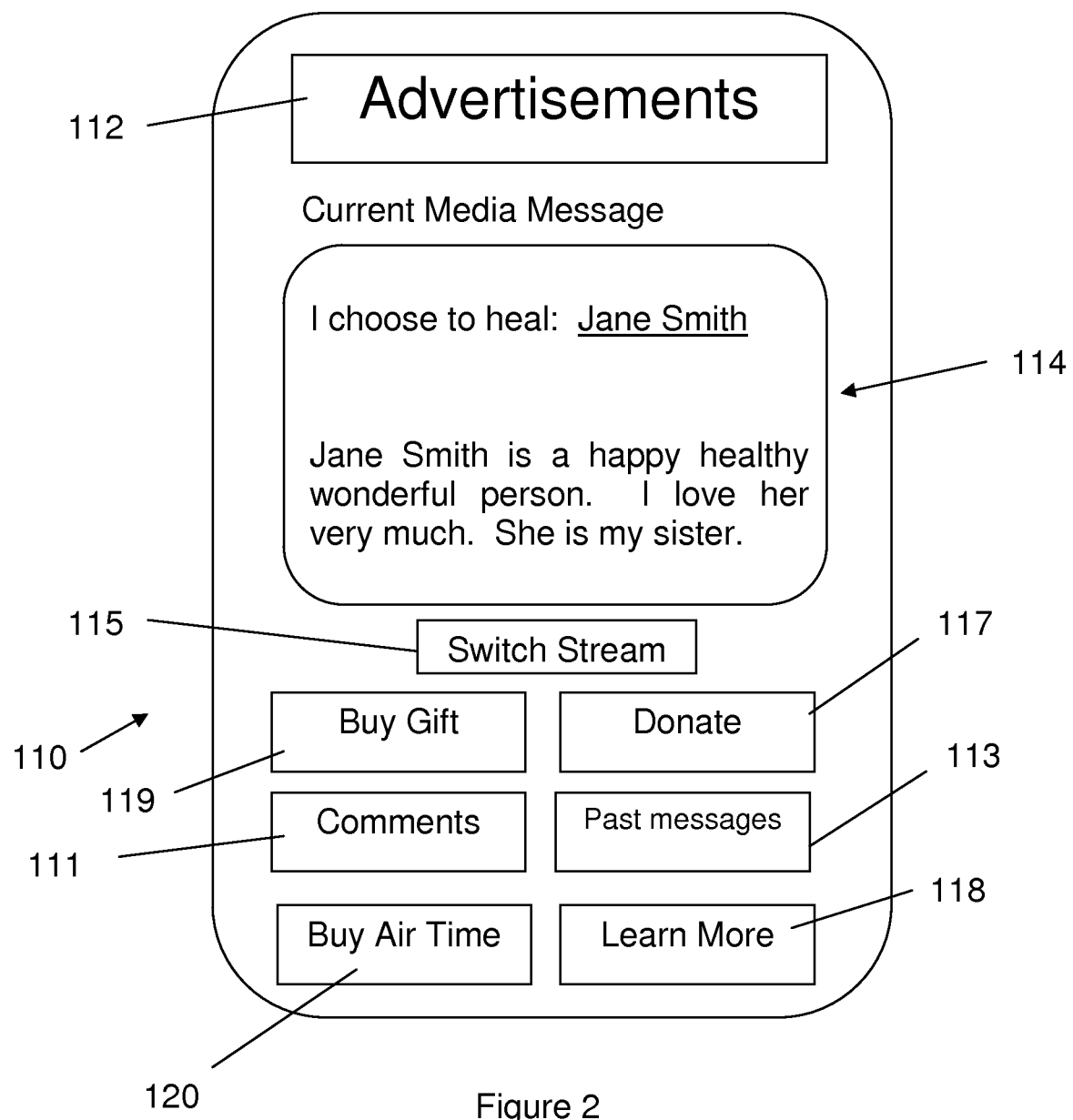
FIG. 2 illustrates a current media content interface according to an embodiment of the present invention.
Figure 3:
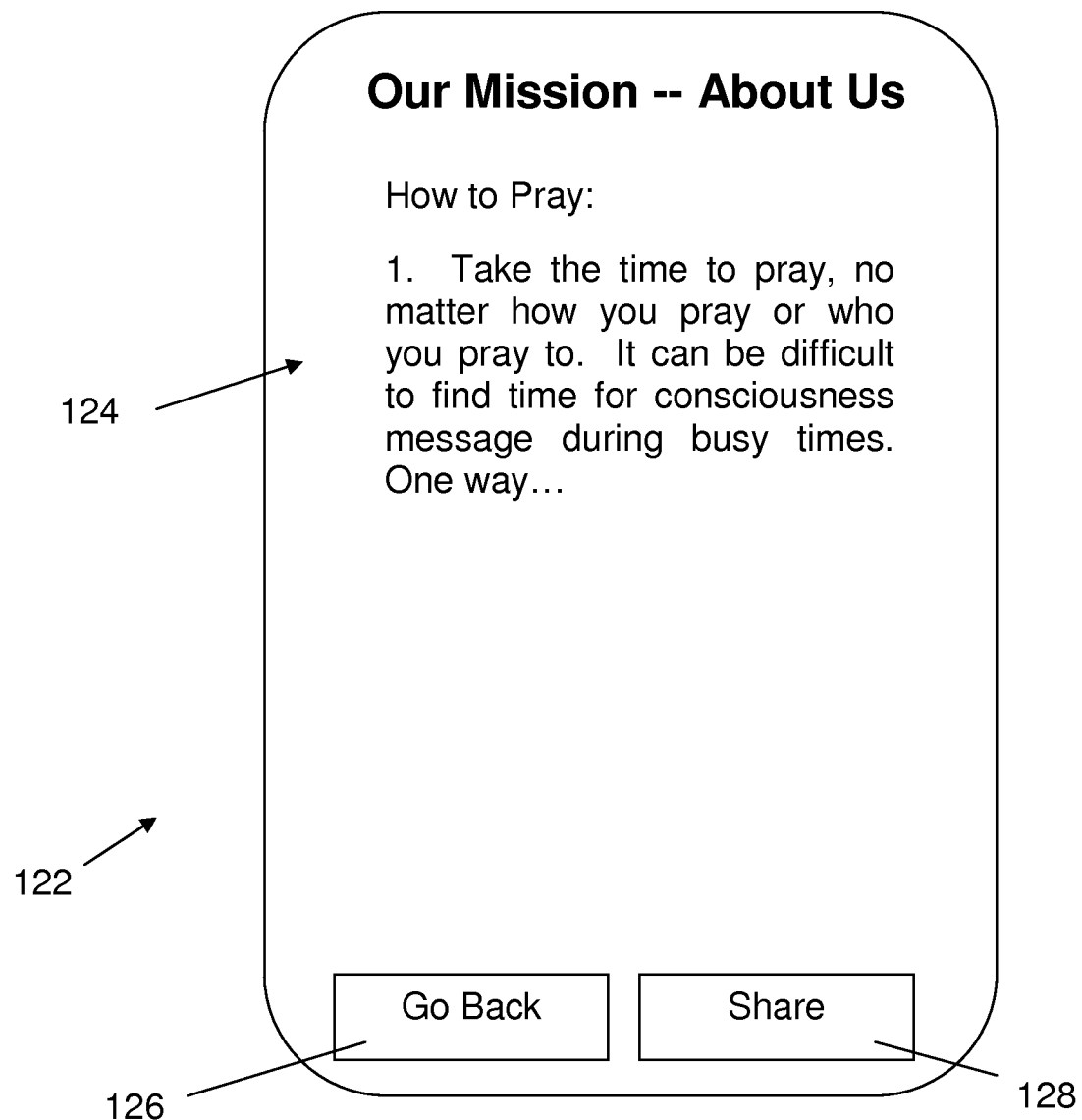
FIG. 3 illustrates an about us interface according to an embodiment of the present invention.

FIGS. 2-9 illustrate various example aspects and interfaces of the mobile media message application according to the present invention. FIG. 2 illustrates the current media message interface 110 that displays the media message currently scheduled by the server 102. The current media message interface 110 preferably includes a media message text display 114 that displays the text of the media message specified by person who created the current media message.

Optionally, the current media message interface includes an advertisement banner 112 for displaying advertisements from a downloaded source, such as from Google AdSense or Apple in app advertising. Optionally, the mobile media message application can allow a user the option to include this banner 112 during the media message creation process to financially subsidize the price of posting the media message.

The interface 110 also includes a comments button 111 that displays a comment interface for leaving messages related to the current media message. A past media messages button 113 is also include for displaying a list of past media messages or bookmarked media messages.

Preferably, multiple feeds or streams are available to the mobile application. For example, some streams can be specific breaking news, religion, music, or pets. Selecting the switch stream button 115 allows the user to switch between these streams.

The donate button 117 allows the user to donate money to originator of the media message, thereby allowing users or entities to raise money in addition to soliciting media messages. The buy gift button 119 allows the user to buy items for the author of the current message or another user. Gifts can include virtual greeting cards, gift certificates, message air time, and similar items. The buy air time button 120 displays an interface for creating and purchasing a media message that will be displayed on the application and the learn more button 118 displays an about us interface 122 seen in FIG. 3.

The about us interface 122 preferably includes information about the developer and information 124 about how to pray. A share button 128 allows the user to share specific media message tips with others (e.g., by emailing text of the media message information 124). The go back button 126 returns the user to the previous screen.

Figure 4:
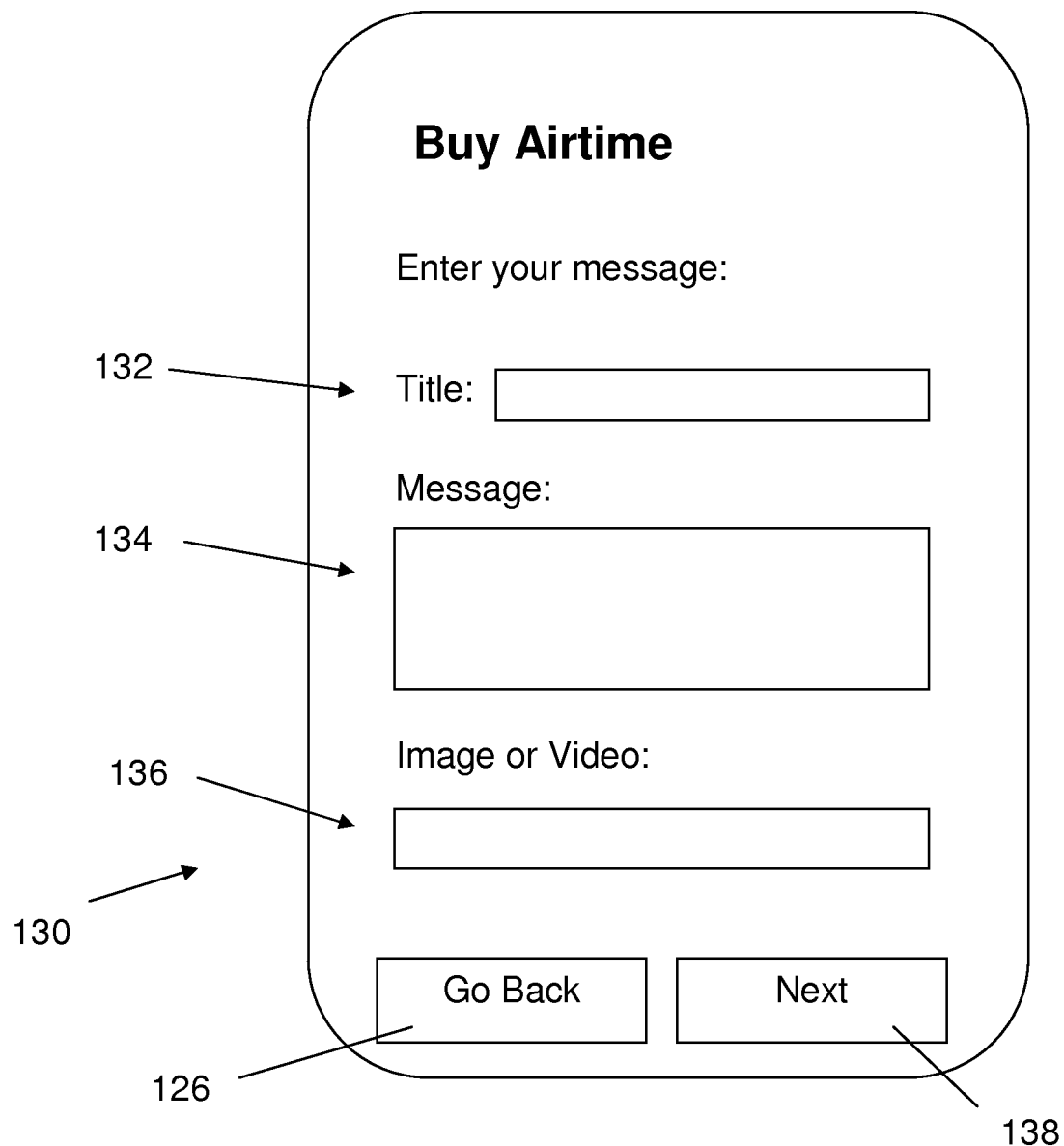
FIG. 4 illustrates an airtime purchase interface according to an embodiment of the present invention.
Figure 5:
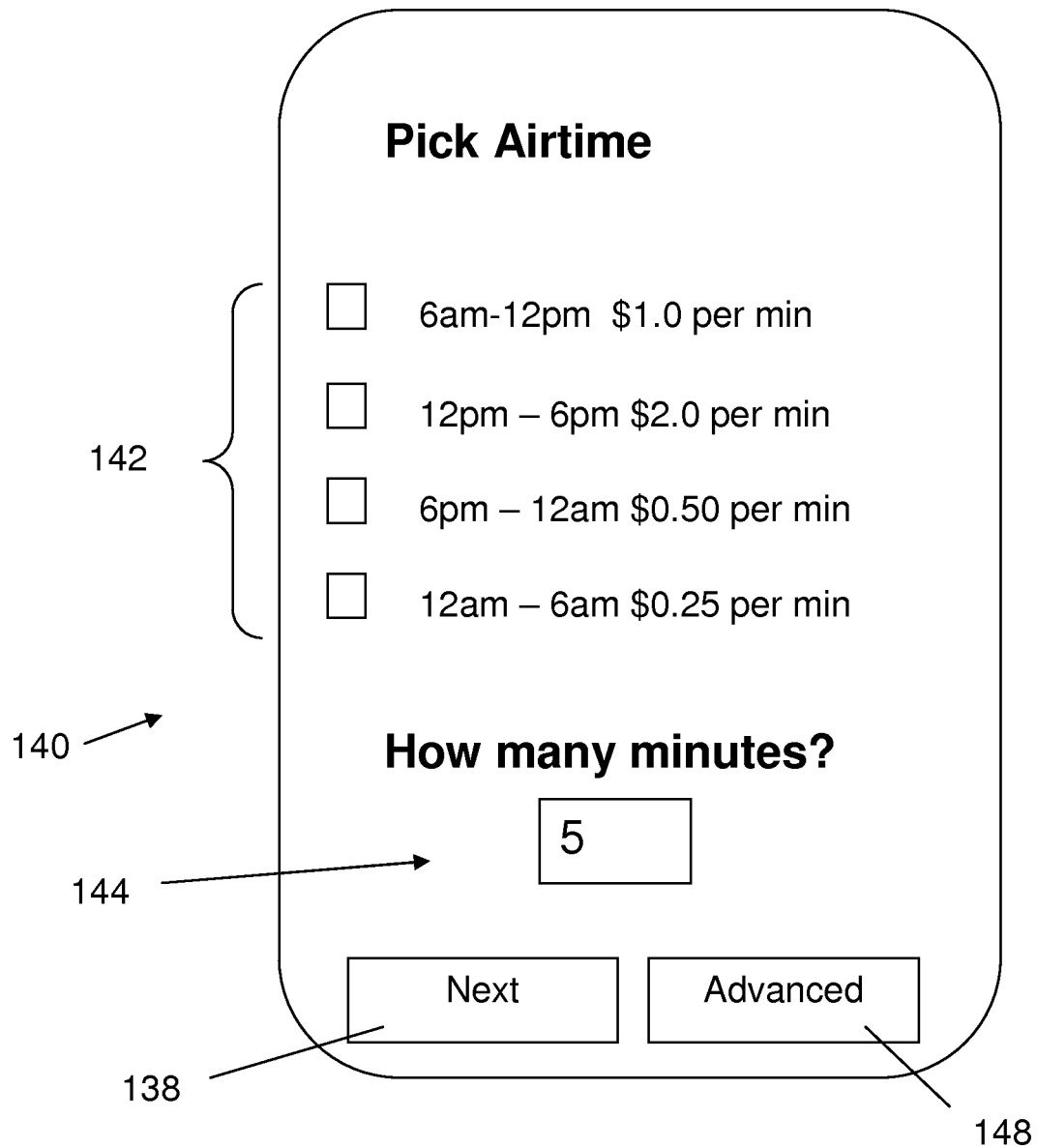
FIG. 5 illustrates an airtime date selection interface according to an embodiment of the present invention.
Figure 6:
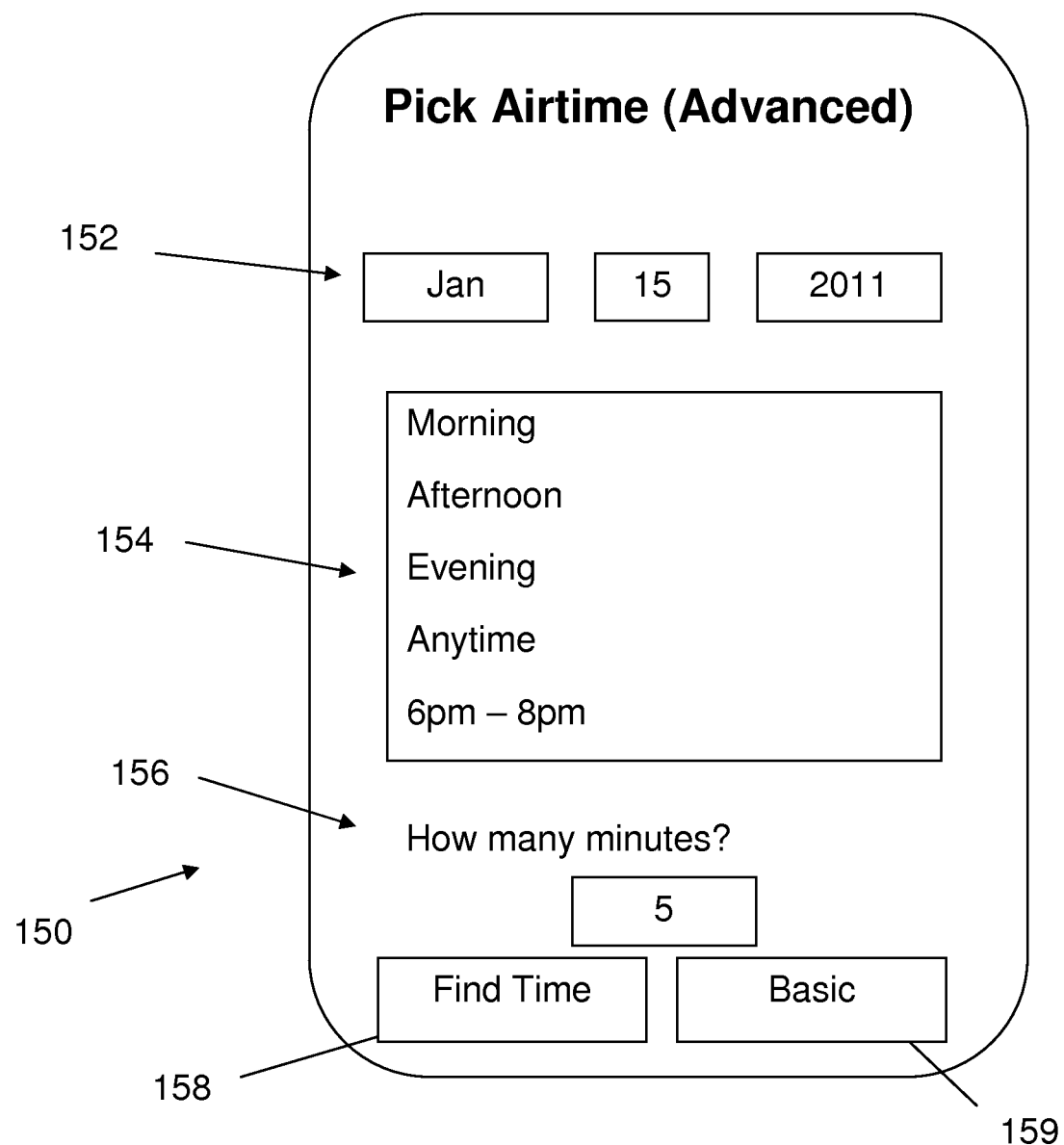
FIG. 6 illustrates an advanced airtime date selection interface according to an embodiment of the present invention.

If the user selects the buy airtime button 120 in interface 110, the buy airtime interface 130 is displayed, as seen in FIG. 4. Title input 132 allows a user to enter a text title for their media message, while text of the media message can be entered in message input 134. Optionally, the user can attach or add a link to an image, audio and/or video in the media input 136. This media is uploaded to the server 102 and rendered in to the stream for broadcast at the scheduled time. The next button 138 displays the airtime selection interface 140 as seen in FIG. 5.

The airtime selection interface 140 preferably provides a plurality of selectable time ranges 142 (e.g., check boxes) and their accompanying cost. A minute input 144 allows the user to specify the amount of time the user would like their media message to be displayed as the current media message. Selecting the advanced button 148 displays the advanced airtime interface 150 seen in FIG. 6.

The advanced airtime interface 150 allows the user more control over exactly when the media message will be shown as the current media message. For example, a date interface 152 allows the user to specify a specific day to air the media message, the time interface 154 provides more detailed time ranges, and the time interface allows input of the amount of time the media message will air as the current media message. Selecting the basic button 159 returns the user to the airtime selection interface 140 while selecting the find time button 158 attempts to find an unreserved free time for the media message.

Figure 7:
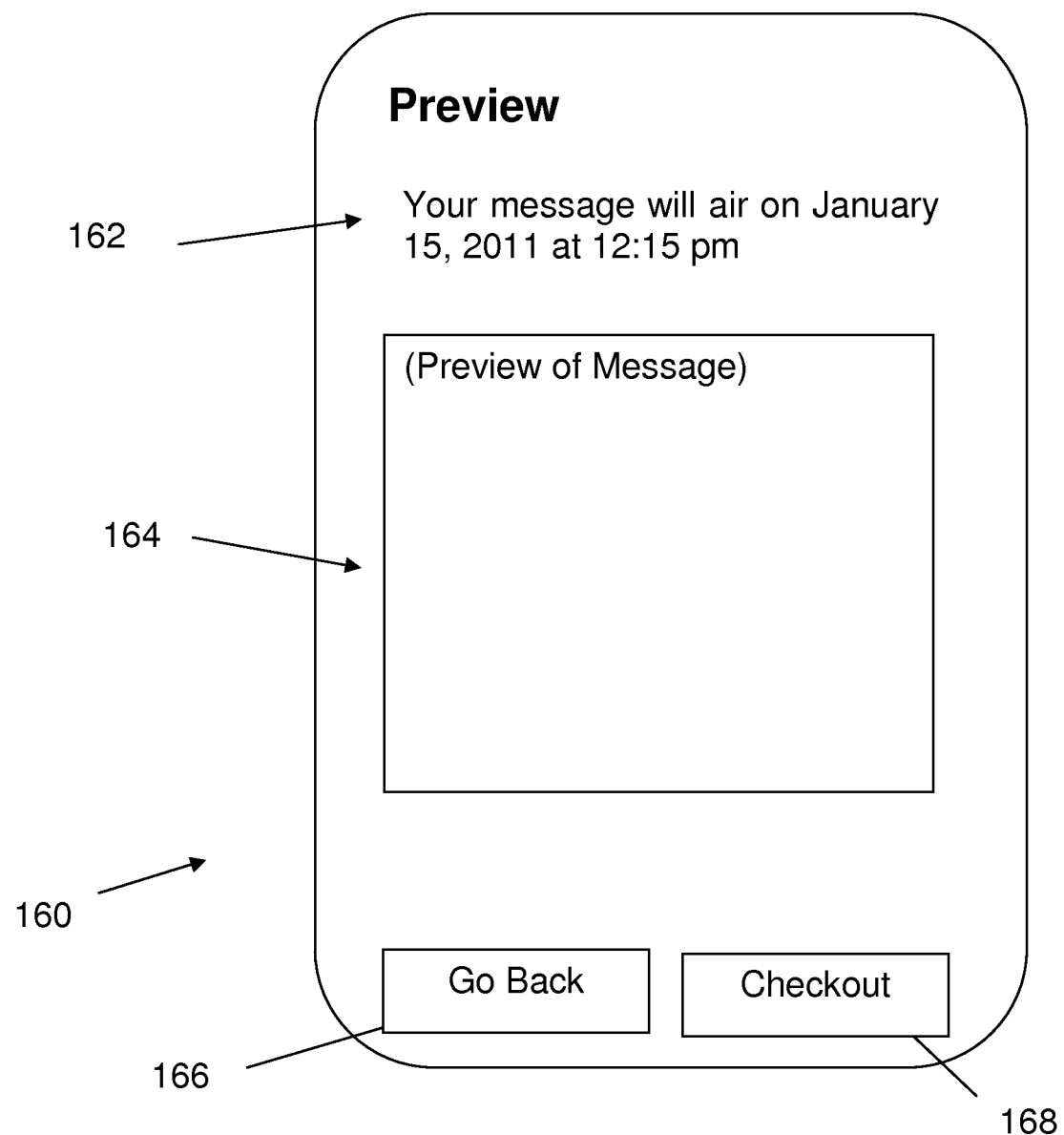
FIG. 7 illustrates a media content preview interface according to an embodiment of the present invention.
Figure 8:
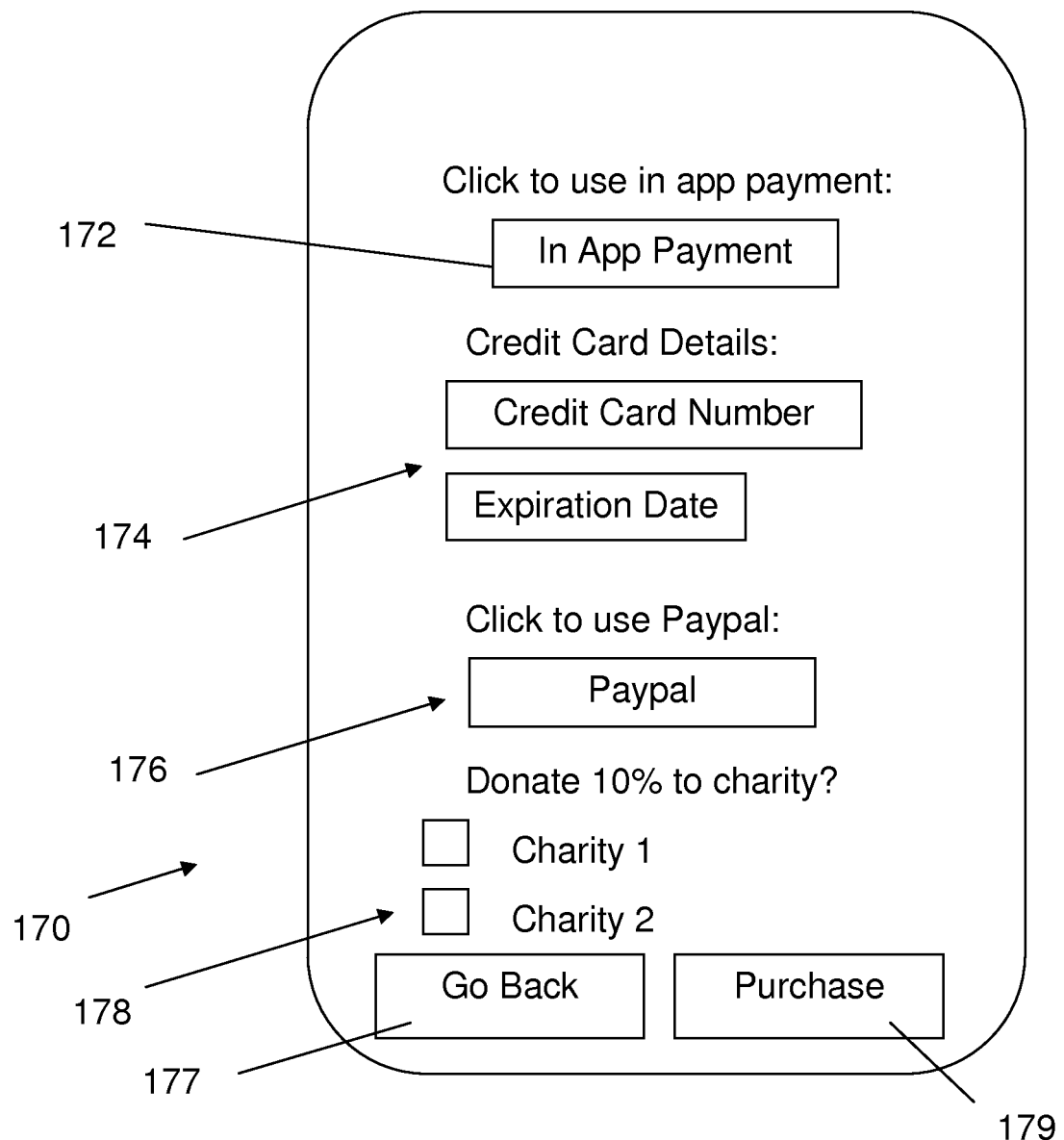
FIG. 8 illustrates a payment interface according to an embodiment of the present invention.

Once the server 102 has found a free time according to the criteria selected by the user, the preview interface 160 is displayed, as seen in FIG. 7. The proposed message date 162 is located at the top of the interface 160, followed by the preview of the media message 164. The user can select the go back button 166 to return to a previous interface to correct information or can select the checkout button 168 to display the payment interface 170, seen in FIG. 8.

The payment interface 170 allows the user to select their desired method of payment. This interface can be used for buying air time on a stream or for any other activity that may require payment (e.g., purchasing gift certificates or greeting cards).

For example, the user can select the in app payment button 172 to cause payment through an "in app" payment system, such as Apple's in app payment system. The user may also enter their credit card information in the credit card input 174 or can select the Paypal button 176 to bring up Paypal login credentials for payment via Paypal. Preferably, the interface 170 includes a plurality of charity inputs 178 (e.g., checkboxes) for specifying donations to specific charities. The user can return to previous interfaces via the go back button 177 or can submit the payment information via the purchase button 179.

Figure 9:
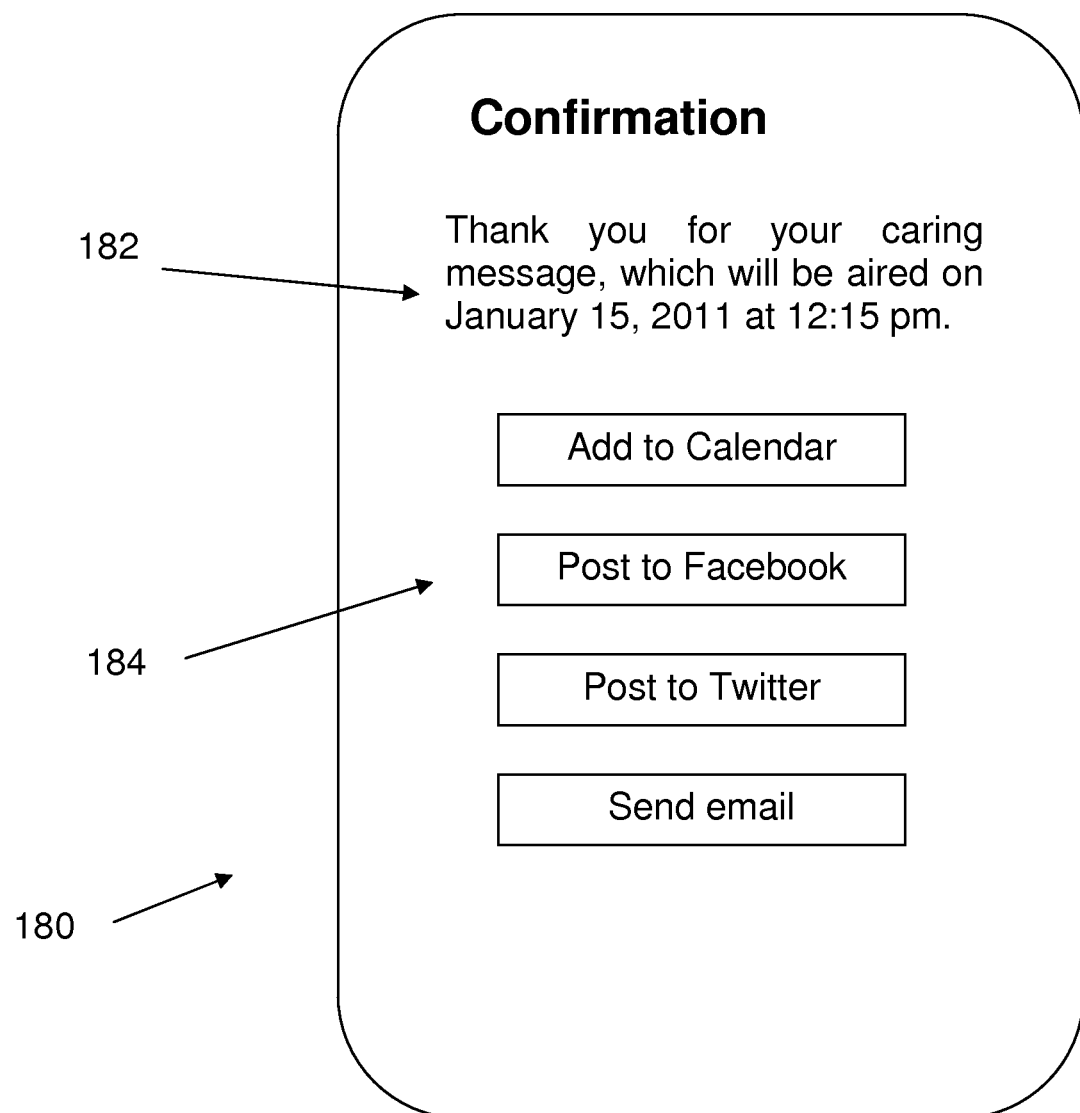
FIG. 9 illustrates a confirmation interface according to an embodiment of the present invention.

Once the payment information has been submitted and confirmed by the server 102, the confirmation interface 180 is displayed, as seen in FIG. 9. A confirmation message 182 is displayed at the top of the interface 180 to confirm the exact time the media message will be available. Additionally, a plurality of media message sharing buttons 184 are displayed to allow the user to easily share details (e.g., date, time, hypertext link) to the media message on various calendar, email, text message or social media websites.

Figure 11:
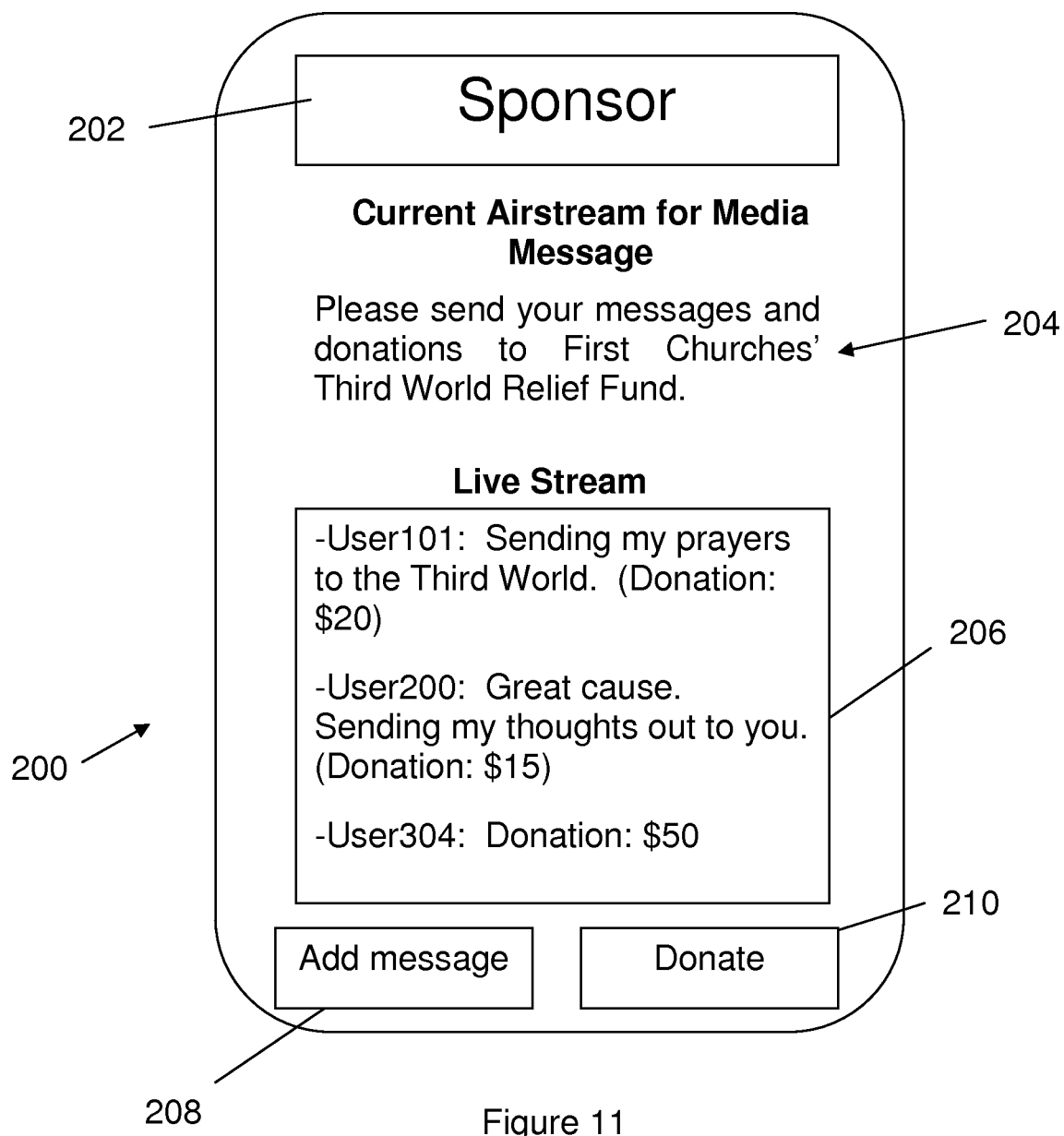
FIG. 11 illustrates a media content airstream interface according to an embodiment of the present invention.

FIG. 11 illustrates an alternate media message interface 200 according to the present invention. The interface 200 allows a user or organization to post a media message, media (music, video, image, etc.) and/or request for donations, seen in the media message display 204. This airstream media message can be purchased through an interface similar to those previously described in this specification. Optionally, an advertiser may sponsor such a stream and post their ad banner in the banner display 202.

The interface 200 also displays live or regularly updated comments and media messages from users in the live stream display 206. If a user wishes to comment, add a greeting card (or similar link) or add a message, the add message button 208 can be selected, prompting the user for a text comments and an optional donation amount. Alternately, the user can select the donate button 210 to donate money without adding a comment (e.g., utilizing the payment interface 170). These comments and donation amounts are transmitted to the server 102, processed, and then displayed in the live stream display 206 for all users to view.

Figure 12:
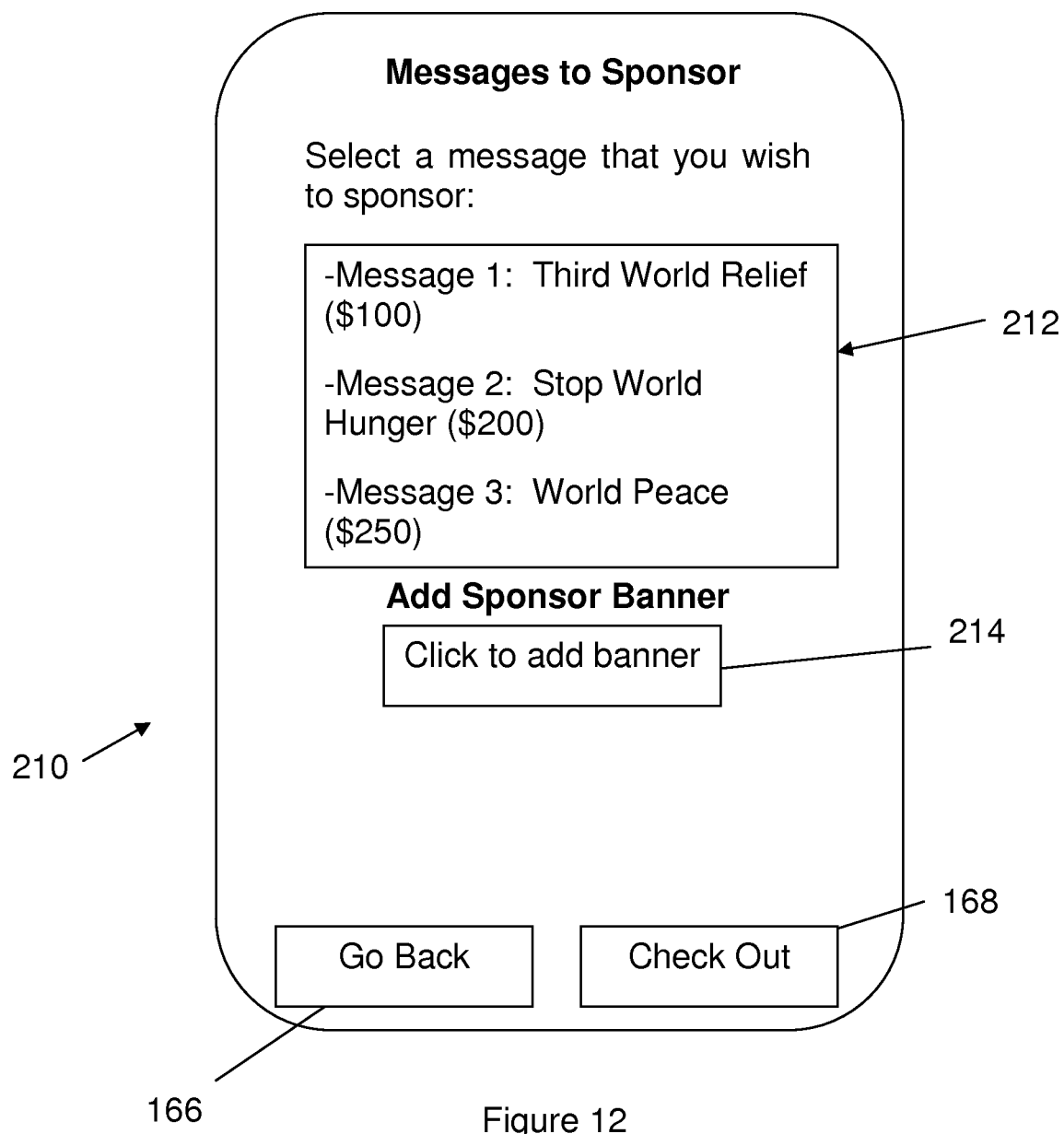
FIG. 12 illustrates a media content sponsorship interface according to an embodiment of the present invention.

FIG. 12 illustrates a sponsor interface 210 that allows an advertiser or user to sponsor a specific current media message or airstream media message. A media message selection input 212 downloads and displays from the server 102 a list of media messages and sponsor prices that are available for sponsorship. A specific media message can be selected and the sponsor's ad banner can be uploaded to the server 102 by clicking the add banner button 214. Once the user is satisfied by their selection, the check out button 168 can be used to pay.

FIG. 13 illustrates an item purchase interface 230 that allows the user to make in app purchases of items via the item selection interface 232. This allows the user to select a desired item (real or virtual) for purchase, then select the check out button 168, which leads to the previously described payment interface 170.

In one specific example, the present invention can be particularly used to facilitate prayer or collective consciousness. For example, users can purchase air time to display a prayer or collective thought. In another example, a request for donations (e.g., from a person or charity) can be uploaded to the stream to allow users to donate money within the mobile application.

In another specific example, the present invention can be used to purchase airtime and upload ongoing news or informational video. In this respect, a stream may be directed to eye witness news or similar breaking new.

In another specific example, a stream can be directed to music videos. Hence, a user can purchase airtime and upload their own music videos that will stream at a specific time and date.

In another example, a stream can be directed to short films. Users can produce their own films, purchase airtime, and then upload the films to air on the channel at a specific time.

In another example according to the present invention, the server can provide a user or company with their own media stream to control. In this respect, the other users can post messages on this third party controlled stream, allowing the stream creator to designate airtime price, which uploads are approved and additional items for purchase.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A mobile device modified with a streaming media application for creating, scheduling, and paying for a media message, the mobile device, comprising:
    a processor;
    a memory;
    a display;
    a communications module;
    a media input interface;
    a display interface; and,
    instructions for the streaming media application stored on the memory;
    wherein the instructions modify the mobile device to allow it to perform the following steps:
        a. creating, on the input interface, a custom $1^{st}$ media message data;
        b. scheduling, via the input interface, delivery of the $1^{st}$ media message data;
        c. paying, via the input interface, for the $1^{st}$ media message data;
        d. uploading, via the communications module, the $1^{st}$ media message data to a $1^{st}$ network-connected server that performs the following steps:
            i. storing the $1^{st}$ media message data;
            ii. coordinating the $1^{st}$ media message data into a $1^{st}$ viewable stream, comprising: the $1^{st}$ media message data; and,
            iii. transmitting the $1^{st}$ viewable stream to one or more mobile devices modified with the instructions for the streaming media application;
        e. receiving, on the display interface, a notification of an available viewable stream, the notification being sent from the $1^{st}$ network-connected server, a $2^{nd}$ network-connected server, or both, the viewable stream being either the $1^{st}$ viewable stream or a $2^{nd}$ viewable stream, the $2^{nd}$ viewable stream, comprising: a $2^{nd}$ media message data; and,
        f. when activated, streaming on the display interface the $1^{st}$ or $2^{nd}$ viewable stream;
    wherein the $1^{st}$ and $2^{nd}$ media message data, independently comprise:
        text, audio, video, image, live-streaming video, or a combination thereof.

2. The mobile device of claim 1, wherein the mobile device, further comprises: at least one camera that can be accessed by the user to assist with creating the custom $1^{st}$ media message data.

3. The mobile device of claim 1, wherein the $1^{st}$ network-connect server, $2^{nd}$ network-connected server, or both notify one or more mobile devices when a new viewable stream is available for streaming.

4. The mobile device of claim 1, wherein:
    the $1^{st}$ and $2^{nd}$ media message data, further comprise: a category; and,
    the display interface is configured to allow the mobile device user to select the category of the viewable stream.

5. The mobile device of claim 1, wherein the $1^{st}$ and $2^{nd}$ media message data, independently, further comprise: a media message air date, a media message air time, or both.

6. The mobile device of claim 1, wherein the display interface is configured to display the viewable stream's air date, air time, or both.

7. The mobile device of claim 1, wherein the $1^{st}$ media message data, further comprises: donation request information, access to a payment method, or both.

8. The mobile device of claim 1, wherein the $1^{st}$ or $2^{nd}$ viewable stream, further comprises: donation request information, access to a payment method, or both.

9. The mobile device of claim 1, wherein the display interface is configured to display on the mobile device simultaneously with the input interface.

10. The mobile device of claim 1, wherein the input interface, further comprises: a content preview interface, whereby the $1^{st}$ media message data can be previewed prior to uploading.

11. The mobile device of claim 1, wherein the $1^{st}$ or $2^{nd}$ viewable stream, independently comprises: at least two media message data, comprising: text, audio, video, live-streaming video, image, or a combination thereof.

12. The mobile device of claim 11, wherein at least one of the $1^{st}$ media message data is video or a text message.

13. The mobile device of claim 1, wherein the display interface, further comprises: a donation interface, a payment interface, a purchase interface, or a combination thereof.

14. The mobile device of claim 1, wherein the display interface further comprises: a comment interface.

15. The mobile device of claim 1, wherein the $1^{st}$ and $2^{nd}$ network-connect servers are the same.

16. The mobile device of claim 1, wherein the $1^{st}$ and $2^{nd}$ viewable streams are the same.

17. The mobile device of claim 1, wherein the steps further comprise:
    making a financial transaction, wherein the financial transaction comprises one or more of the following: a donation, a sponsorship, or a purchase within the media application.

18. The mobile device of claim 1, wherein the $1^{st}$ media message data is a user enabled advertisement or sponsorship that, further comprises: air date, air time, a payment, or a combination thereof, and the $1^{st}$ network-connected server incorporates the advertisement or sponsorship into the $1^{st}$ viewable stream.

19. The mobile device of claim 1, wherein the input interface, further comprises: an advertisement interface, sponsorship interface, or both, wherein an advertisement or sponsorship can be scheduled, uploaded, and payment made via the corresponding advertisement or sponsorship interface.

20. The mobile device of claim 1, wherein the $1^{st}$ viewable stream, $2^{nd}$ viewable stream, or both, further comprise: an advertisement, sponsorship, or both.

21. The mobile device of claim 1, wherein the input interface, further comprises: a buy air time interface.

22. The mobile device of claim 1, wherein the input interface, further comprises: a donation interface, purchase interface, or both.

23. The mobile device of claim 1, wherein the $1^{st}$ or $2^{nd}$ media message data, independently, further comprises: a link to a media file.

24. The mobile device of claim 1, wherein the $1^{st}$ viewable stream is scheduled to air at a specific time.

25. The mobile device of claim 1, wherein the $2^{nd}$ viewable stream is scheduled to air at a specific time.

26. The mobile device of claim 1, wherein the $1^{st}$ viewable stream, further comprises: expiration information relating to the $1^{st}$ viewable stream.

27. The mobile device of claim 1, wherein the $2^{nd}$ viewable stream, further comprises: expiration information relating to the $2^{nd}$ viewable stream.

28. A mobile device streaming media application for creating, scheduling, and paying for a media message, comprising:
   a $1^{st}$ interface configured to interact with a processor of a mobile device; and,
   a $2^{nd}$ interface configured to interact with a memory of the mobile device;
   wherein the media application instructions stored on the memory of the mobile device, when executed, performs the following steps:
   a. creating, on the input interface, a custom $1^{st}$ media message data;
   b. scheduling, via the input interface, delivery of the $1^{st}$ media message data;
   c. paying, via the input interface, for the $1^{st}$ media message data;
   d. uploading, via the communications module, the $1^{st}$ media message data to a $1^{st}$ network-connected server that performs the following steps:
      i. storing the $1^{st}$ media message data;
      ii. coordinating the $1^{st}$ media message data into a $1^{st}$ viewable stream, comprising: the $1^{st}$ media message data; and,
      iii. transmitting the $1^{st}$ viewable stream to one or more mobile devices modified with the instructions for the streaming media application;
   e. receiving, on the display interface, a notification of an available viewable stream, the notification being sent from the $1^{st}$ network-connected server, a $2^{nd}$ network-connected server, or both, the viewable stream being either the $1^{st}$ viewable stream or a $2^{nd}$ viewable stream, the $2^{nd}$ viewable stream, comprising: a $2^{nd}$ media message data; and,
   f. when activated, streaming on the display interface the $1^{st}$ or $2^{nd}$ viewable stream;
wherein the $1^{st}$ and $2^{nd}$ media message data, independently comprise:
   text, audio, video, image, live-streaming video, or a combination thereof.

* * * * *